June 7, 1938.     G. H. SCHANZ     2,120,003
DUSTING APPARATUS
Filed July 21, 1937
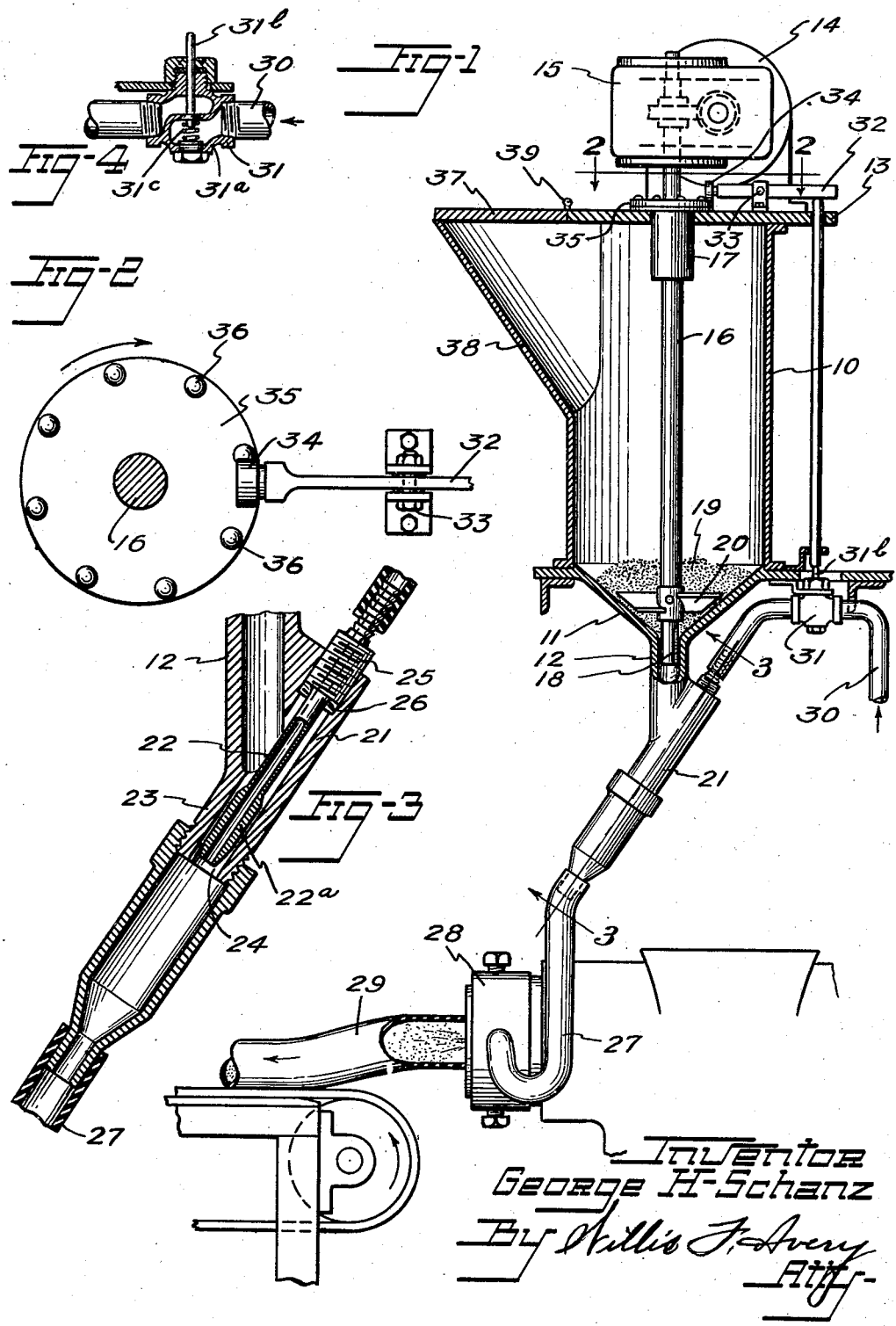
Inventor
George H. Schanz
By Willis F. Avery
Atty Patented June 7, 1938

2,120,003

UNITED STATES PATENT OFFICE 2,120,003

DUSTING APPARATUS

George H. Schanz, Akron, Ohio, assignor to The B. F. Goodrich Company, New York, N. Y., a corporation of New York Application July 21, 1937, Serial No. 154,823

3 Claims. (Cl. 221—61)

This invention relates to apparatus for applying dust to a surface such, for example, as the surface of rubber composition.

In the manufacture of articles of plastic material such as rubber compositions or the like, it is customary to apply a coating of dust to the adhesive surfaces of the material to prevent the material from adhering to similar material with which it comes in contact. Materials such as powdered mica, soapstone, flour, or starch are ordinarily used for this purpose.

The principal objects of this invention are to provide dependable and positive operation, to provide simplicity of construction, and to provide uniformity of deposit.

These and other objects will appear from the following description and the accompanying drawing.

Of the drawing:

Fig. 1 is an elevation, partly in section, constructed according to and embodying the invention in its preferred form for applying dust to the liner surface of an extruded rubber tube, part of the extruding machine and a conveyor being also shown.

Fig. 2 is a cross-sectional view taken on line 2—2 of Fig. 1.

Fig. 3 is a cross-sectional view taken on line 3—3 of Fig. 1.

Fig. 4 is a detail sectional view of the air valve.

Referring to the drawing, the numeral 10 designates a dust receptacle having a conical funnel-like bottom 11 formed with a central outlet tube 12. A cover 13 at the top of the receptacle serves as a platform to support an electric motor 14 which, through a speed reducer 15 of the worm and gear type, drives a vertical shaft 16 which extends through the receptacle and is journaled in a bearing 17 fixed to the cover 13 and in the outlet 12 at its lower end. A longitudinal groove 18 formed in the shaft 16 where it enters the outlet 12, provides for passage of the dusting material 19 past the end of the shaft. A plurality of mixer blades 20, fixed to the shaft 16, have surfaces inclined with respect to the axis of the shaft and fit closely in the funnel portion of the receptacle so as to plough up the dust 19 and mix it with the air in the receptacle, so that it will be kept well stirred and packing of it will be avoided.

The outlet tube 12 enters from the side, and preferably at an acute angle, an ejector tube 21 within which is axially mounted a jet tube 22 having a head 22a of enlarged diameter located in a constricted portion 23 of the ejector tube, and therewith defining a restricted passage 24 adapted to increase the velocity and therefore to reduce the pressure of dust-laden air flowing from the pipe 12. The jet tube 22 is screw-threaded as at 25 to fit a threaded counter-bore 26 of the ejector tube and thereby to provide for adjustment of the jet longitudinally of the ejector pipe. The ejector tube 21 may be connected by any conduit, such as the rubber hose 27 so as to deliver the supply of air-laden dust to the work. As shown in the drawing the hose 27 may connect through the die 28 of an extruding machine whereby the dust is delivered to the inner surface of a plastic rubber tube 29 progressively as the tube is formed so as to prevent the inner surfaces from adhering to each other upon collapse of the tube.

As the dust is inclined to settle out of the air, it is found desirable to deliver the air from the jet tube in a series of spurts whereby vibration of the air in the hose 27 is utilized to keep the dust-carrying stream constantly agitated. For this purpose, the air line 30, which supplies the jet 22 is supplied with a valve 31 which may be of the whistle type, including a valve body 31a having a dividing partition in which is formed a seat for a plunger 31b, the stem of which extends from the body and may be depressed to open the valve which is normally closed by a spring 31c and the pressure of the air in the pipe 30. The plunger of the valve is adapted to be intermittently depressed by one end of a lever 32 fulcrumed as at 33 on the cover 13 and carrying a roller 34 adapted to follow a cam disc 35 fixed to shaft 16. The cam disc is formed with a series of projections 36 adapted intermittently to raise the roller 34 and thereby to release spurts of air from the jet 22.

To provide for filling the container 10 a hinged portion 37 of the cover overlies a hopper 38 and is hinged at 39 to the cover 13.

Modifications may be made within the invention as it is defined in the following claims without departing from the scope thereof.

I claim:

1. Apparatus for supplying a mixture of air and dust comprising a dust receptacle having an outlet discharging into an ejector, a positively driven dust agitator in said receptacle, a valve for positively controlling supply of pressure fluid to the ejector, and means controlled by movement of the dust agitator for operating said valve.

2. Apparatus for supplying a mixture of air and dust comprising a dust receptacle having an outlet discharging into an ejector, a positively driven dust agitator in said receptacle, a valve for positively controlling supply of pressure fluid to the ejector, and means controlled by movement of the dust agitator for intermittently opening and closing said valve.

3. Apparatus for supplying a mixture of air and dust comprising a dust receptacle having an outlet discharging into an ejector, a positively driven dust agitator in said receptacle, a valve for positively controlling supply of pressure fluid to the ejector, and means controlled by movement of the dust agitator for intermittently opening and closing said valve.

GEORGE H. SCHANZ.